US012665207B2

(12) United States Patent
Yang et al.

(10) Patent No.: US 12,665,207 B2
(45) Date of Patent: Jun. 23, 2026

(54) AUTOMATIC FLOW RATE CONTROL CARTRIDGE AND FUEL CELL MEMBRANE HUMIDIFIER COMPRISING SAME

(71) Applicant: KOLON INDUSTRIES, INC., Seoul (KR)

(72) Inventors: Hyoung Mo Yang, Seoul (KR); Kyoung Ju Kim, Seoul (KR); Woong Jeon Ahn, Seoul (KR); In Ho Kim, Seoul (KR)

(73) Assignee: KOLON INDUSTRIES, INC., Seoul (KR)

( * ) Notice: Subject to any disclaimer, the term of this patent is extended or adjusted under 35 U.S.C. 154(b) by 495 days.

(21) Appl. No.: 18/260,529

(22) PCT Filed: Jan. 21, 2022

(86) PCT No.: PCT/KR2022/001150
§ 371 (c)(1),
(2) Date: Jul. 6, 2023

(87) PCT Pub. No.: WO2022/164141
PCT Pub. Date: Aug. 4, 2022

(65) Prior Publication Data
US 2024/0055625 A1 Feb. 15, 2024

(30) Foreign Application Priority Data
Jan. 28, 2021 (KR) ......................... 10-2021-0012278

(51) Int. Cl.
*H01M 8/04* (2016.01)
*H01M 8/04119* (2016.01)
(52) U.S. Cl.
CPC ... *H01M 8/04141* (2013.01); *H01M 8/04149* (2013.01)

(58) Field of Classification Search
CPC .................................................. H01M 8/04141
See application file for complete search history.

(56) References Cited

U.S. PATENT DOCUMENTS 9,209,467 B2 * 12/2015 Kim .................. H01M 8/04141
11,611,090 B2 3/2023 Ahn
(Continued)

FOREIGN PATENT DOCUMENTS

DE 102013004839 A1 * 1/2014 ........ H01M 8/04126
JP 2007-093192 A 4/2007
(Continued)

OTHER PUBLICATIONS

Extended European Search Report dated Jul. 3, 2024.
Office Action from Japanese patent office for a corresponding Japanese patent application.

*Primary Examiner* — Robert A Hopkins
(74) *Attorney, Agent, or Firm* — Harvest IP Law, LLP

(57) ABSTRACT

The present invention relates to an automatic flow rate control cartridge and a fuel cell membrane humidifier comprising same, the automatic flow rate control cartridge being capable of automatically controlling the flow rate of exhaust gas that is discharged from a fuel cell stack and is introduced into the cartridge. The automatic flow rate control cartridge according to an embodiment of the present invention comprises: an inner case having formed therein a first mesh hole portion through which the exhaust gas discharged from a fuel cell stack is introduced, and a second mesh hole portion through which the exhaust gas introduced through the first mesh hole portion is moisture-exchanged and then discharged to the outside; and a flow rate control unit that is movably formed on one surface of the inner case and controls the flow rate of the exhaust gas introduced into the first mesh hole portion according to the flow rate of the exhaust gas.

18 Claims, 4 Drawing Sheets

(56)  References Cited

U.S. PATENT DOCUMENTS

| | | |
|---|---|---|
| 2019/0326618 A1 | 10/2019 | Oh |
| 2020/0185738 A1 | 6/2020 | Kim |

FOREIGN PATENT DOCUMENTS

| | | |
|---|---|---|
| JP | 2008119615 A | 5/2008 |
| JP | 2010-112568 A | 5/2010 |
| JP | 2010-146810 A | 7/2010 |
| JP | 2011-089749 A | 5/2011 |
| JP | 2020-512664 A | 4/2020 |
| KR | 10-2007-0053825 A | 5/2007 |
| KR | 20080077598 A | 8/2008 |
| KR | 20100057105 A | 5/2010 |
| KR | 20110062011 A | 6/2011 |
| KR | 101459907 B1 | 11/2014 |
| KR | 20180037389 A | 4/2018 |
| KR | 20180066418 A | 6/2018 |
| KR | 20190140855 A | 12/2019 |
| KR | 20200122260 A | 10/2020 |

* cited by examiner

A-A'

300 : 310 ~ 320

$300 : 310 \sim 320$

AUTOMATIC FLOW RATE CONTROL CARTRIDGE AND FUEL CELL MEMBRANE HUMIDIFIER COMPRISING SAME

CROSS REFERENCE TO RELATED APPLICATION

This application is a National Stage filing under 35 U.S.C. 371 of International Application No. PCT/KR2022/001150 filed on Jan. 21, 2022, and claims priority to Korean Patent Application No. 10-2021-0012278 filed on Jan. 28, 2021, the disclosures of which is incorporated herein by reference in its entirety.

TECHNICAL FIELD

The present invention relates to a cartridge and a fuel cell membrane humidifier comprising the same, and more specifically, to an automatic flow rate control cartridge capable of automatically controlling a flow rate of an off-gas discharged from a fuel cell stack and flowing into the cartridge, and a fuel cell membrane humidifier comprising the same.

BACKGROUND ART

Fuel cells are power generation cells that produce electricity through coupling between hydrogen and oxygen. The fuel cells have an advantage of being able to continuously produce electricity as long as the hydrogen and the oxygen are supplied, and having an efficiency that is about twice higher than an internal combustion engine because of no heat loss, unlike general chemical cells such as dry batteries or storage batteries.

Further, since chemical energy generated through coupling between the hydrogen and the oxygen is directly converted into electrical energy, emission of pollutants is reduced. Therefore, the fuel cells have an advantage of being environmentally friendly and being able to reduce concerns about resource depletion due to increased energy consumption.

These fuel cells are roughly classified into, for example, a polymer electrolyte membrane fuel cell (PEMFC), a phosphoric acid fuel cell (PAFC), a molten carbonate fuel cell (MCFC), a solid oxide fuel cell (SOFC), and an alkaline fuel cell (AFC) depending on a type of electrolyte used.

These fuel cells fundamentally operate according to the same principle, but have a difference in a type of fuel used, an operating temperature, a catalyst, an electrolyte, or the like. Among the cells, the polymer electrolyte membrane fuel cell (PEMFC) is known to be the most promising not only for small-scale stationary power generation equipment but also for transportation systems because the polymer electrolyte membrane fuel cell operates at a lower temperature than other fuel cells and can be miniaturized due to a high output density.

One of the most important factors in improving the performance of the polymer electrolyte membrane fuel cell (PEMFC) is to maintain moisture content by supplying a certain amount or more of moisture to a polymer electrolyte membrane (or proton exchange membrane: PEM) of a membrane electrode assembly (MEA). This is because the efficiency of power generation is rapidly degraded when the polymer electrolyte membrane is dried.

Examples of a method for humidifying the polymer electrolyte membrane include 1) a bubbler humidification scheme for filling a pressure-resistant container with water and then passing a target gas through a diffuser to supply moisture, 2) a direct injection scheme for calculating a moisture supply amount required for a fuel cell reaction and directly supplying moisture to a gas flow pipe through a solenoid valve, and 3) a humidification membrane scheme for supplying moisture to a fluidized gas layer using a polymer separation membrane.

Among these, the membrane humidification scheme for humidifying a polymer electrolyte membrane by providing water vapor to air supplied to the polymer electrolyte membrane using a membrane that selectively permeates only water vapor contained in an off-gas is advantageous in that a weight and size of a humidifier can be reduced.

A selective permeable membrane used in the membrane humidification scheme is preferably a hollow fiber membrane having a large permeable area per unit volume when a module is formed. That is, when a humidifier is manufactured using hollow fiber membranes, there are advantages that high integration of the hollow fiber membranes with a large contact surface area is possible so that a fuel cell can be sufficiently humidified even with a small capacity, low-cost materials can be used, and moisture and heat contained in an off-gas discharged with a high temperature from the fuel cell can be recovered and can be reused through the humidifier.

FIG. 1 is an exploded perspective view illustrating a fuel cell membrane humidifier according to the related art, FIG. 2 is a cross-sectional view taken along line A-A' of FIG. 1, and FIG. 3 is a cross-sectional view taken along line B-B' of FIG. 1.

As illustrated in FIGS. 1 to 3, a fuel cell membrane humidifier 10 of the related art includes a humidification module 11 in which moisture exchange between air supplied from the outside and an off-gas discharged from a fuel cell stack (not illustrated) occurs, and caps 12 coupled to both ends of the humidification module 11.

One of the caps 12 transfers the air supplied from the outside to the humidification module 11, and the other transfers the air humidified by the humidification module 11 to the fuel cell stack.

The humidification module 11 includes a mid-case 11a having an off-gas inlet 11b and an off-gas outlet 11c, and at least one cartridge 20 disposed in the mid-case 11a. One cartridge is illustrated in the drawing. The cartridge 20 includes an inner case 21, and a plurality of hollow fiber membranes 22 and potting portions 23 that fix both ends of a bundle of hollow fiber membranes 22 are formed inside the inner case 21. The potting portions 23 are generally formed by curing a liquid polymer such as a liquid polyurethane resin through a casting scheme.

A resin layer 11e is formed between the cartridge 20 and the mid-case 11a, and the resin layer 11e fixes the cartridge 20 to the mid-case 11a and blocks inner spaces of the caps 12 and an inner space of the mid-case 111.

The inner space of the mid-case 11a is divided into a first space S1 and a second space S2 by partition walls 11d. The inner case 21 includes a first mesh hole portion 24a disposed in a mesh form for fluid communication with the first space S1, and a second mesh hole portion 24b disposed in a mesh form for fluid communication with the second space S2.

An off-gas flowing into the first space S1 of the mid-case 11a through the off-gas inlet 11b flows into the inner case 21 through the first mesh hole portion 24a and comes into contact with outer surfaces of the hollow fiber membranes 22. Subsequently, the off-gas deprived of moisture exits the second space S2 through the second mesh hole portion 24b, and then, is discharged from the mid-case 11a through the off-gas outlet 11c. Such a cartridge 20 including the inner case 21 has an advantage that the cartridge 20 can be easily assembled to the mid-case 11*a* and can be easily replaced.

In such a cartridge 20 of the related art, since a constant flow rate of the off-gas always flows into the inner case 21 through the first mesh hole portion 24*a* regardless of an output amount of the fuel cell stack, there is concern that excessive humidification may occur in some cases.

DISCLOSURE

Technical Problem

An object of the present invention is to provide an automatic flow rate control cartridge capable of automatically controlling a flow rate of an off-gas discharged from a fuel cell stack and flowing into the cartridge, and a fuel cell membrane humidifier comprising the same.

Technical Solution

An automatic flow rate control cartridge according to an embodiment of the present invention includes an inner case including a first mesh hole portion through which an off-gas discharged from a fuel cell stack flows into the inside, and a second mesh hole portion through which the off-gas flowing into the inside through the first mesh hole portion is discharged to the outside after moisture exchange; and a flow rate control portion formed to be movable on a surface of the inner case and configured to control a flow rate of the off-gas flowing into the inside through the first mesh hole portion depending on the flow rate of the off-gas.

In the automatic flow rate control cartridge according to the embodiment of the present invention, the flow rate control portion may include a blocking member formed on one surface of the inner case to block at least one mesh hole window constituting the first mesh hole portion so that the off-gas does not flow into the inside; and a control member formed on one surface of the blocking member and configured to move the blocking member while being compressed or expanded depending on the flow rate of the off-gas.

In the automatic flow rate control cartridge according to the embodiment of the present invention, the control member may include a pressing member formed in a form inclined at a predetermined angle with respect to one side of the blocking member; and an elastic member formed to be fixed to the pressing member and capable of being compressed or expanded depending on the flow rate of the off-gas.

Further, a fuel cell membrane humidifier according to an embodiment of the present invention includes a mid-case; caps fastened to the mid-case; and at least one cartridge disposed in the mid-case and configured to accommodate a plurality of hollow fiber membranes, wherein the cartridge includes an inner case including a first mesh hole portion through which an off-gas discharged from a fuel cell stack flows into the inside, and a second mesh hole portion through which the off-gas flowing into the inside through the first mesh hole portion is discharged to the outside after moisture exchange; and a flow rate control portion formed to be movable on a surface of the inner case and configured to control a flow rate of the off-gas flowing into the inside through the first mesh hole portion depending on the flow rate of the off-gas.

In the fuel cell membrane humidifier according to the embodiment of the present invention, the flow rate control portion may include a blocking member formed on one surface of the inner case to block at least one mesh hole window constituting the first mesh hole portion so that the off-gas does not flow into the inside; and a control member formed on one surface of the blocking member and configured to move the blocking member while being compressed or expanded depending on the flow rate of the off-gas.

In the fuel cell membrane humidifier according to the embodiment of the present invention, the control member may include a pressing member formed in a form inclined at a predetermined angle with respect to one side of the blocking member; and an elastic member formed to be fixed to the pressing member and capable of being compressed or expanded depending on the flow rate of the off-gas.

The fuel cell membrane humidifier according to an embodiment of the present invention may include a partition wall configured to partition an inner space of the mid-case, wherein one end of the elastic member may be fixed to the partition wall and the other end is fixed to the pressing member.

The fuel cell membrane humidifier according to an embodiment of the present invention may include a resin layer formed between the mid-case and the cartridge, wherein one end of the elastic member may be fixed to the resin layer and the other end is fixed to the pressing member.

The fuel cell membrane humidifier according to an embodiment of the present invention may include a gasket assembly formed between the mid-case and the cartridge, wherein one end of the elastic member may be fixed to the gasket assembly and the other end is fixed to the pressing member.

Other specific matters of implementation examples according to various aspects of the present invention are included in the detailed description below.

Advantageous Effects

According to the present invention, it is possible to automatically control the flow rate of the off-gas discharged from the fuel cell stack and flowing into the cartridge.

MODE FOR DISCLOSURE

Since various changes may be made to the present invention, which may have several embodiments, specific embodiments will be illustrated and described in detail herein. However, it will be understood that this is not intended to limit the present invention to the specific embodiments, and all changes, equivalents, or substitutions included in the spirit and scope of the present invention are included.

The terms used herein are used for the purpose of describing specific embodiments only and are not intended to limit the present invention. The singular expressions "a," "an" and "the" include the plural expressions, unless the context clearly indicates otherwise. It will be understood that the terms "include" or "have" herein specify the presence of features, numbers, steps, operations, components, parts or combinations thereof described herein, but do not preclude the presence or addition of one or more other features, numbers, steps, operations, components, parts or combinations thereof. Hereinafter, a fuel cell membrane humidifier according to embodiments of the present invention will be described with reference to the drawings.

Figure 1:
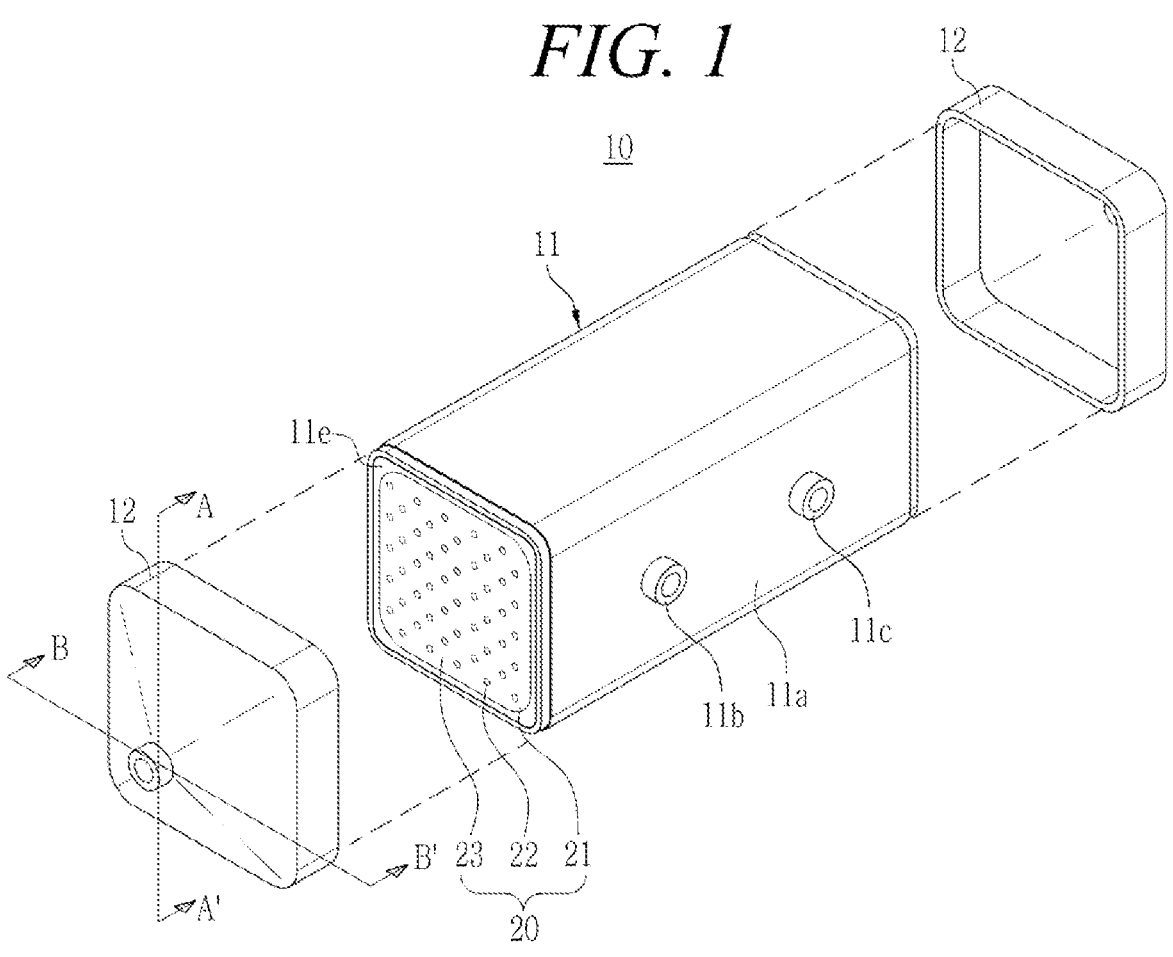
FIG. 1 is an exploded perspective view illustrating a fuel cell membrane humidifier according to the related art.
Figure 2:
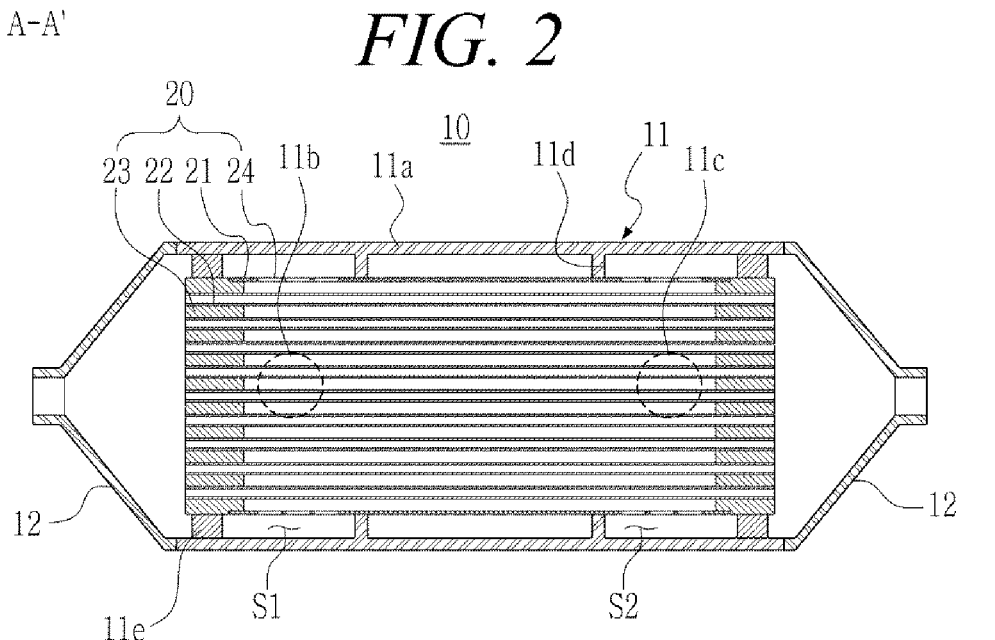
FIG. 2 is a cross-sectional view taken along line A-A' of FIG. 1.
Figure 3:
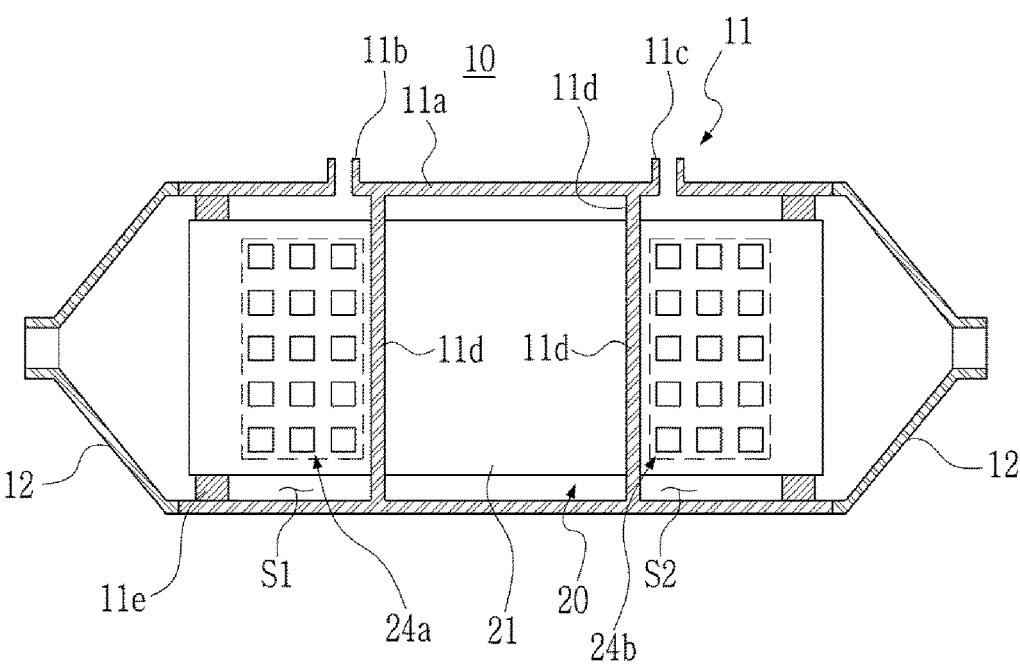
FIG. 3 is a cross-sectional view taken along line B-B' of FIG. 1.
Figure 4:
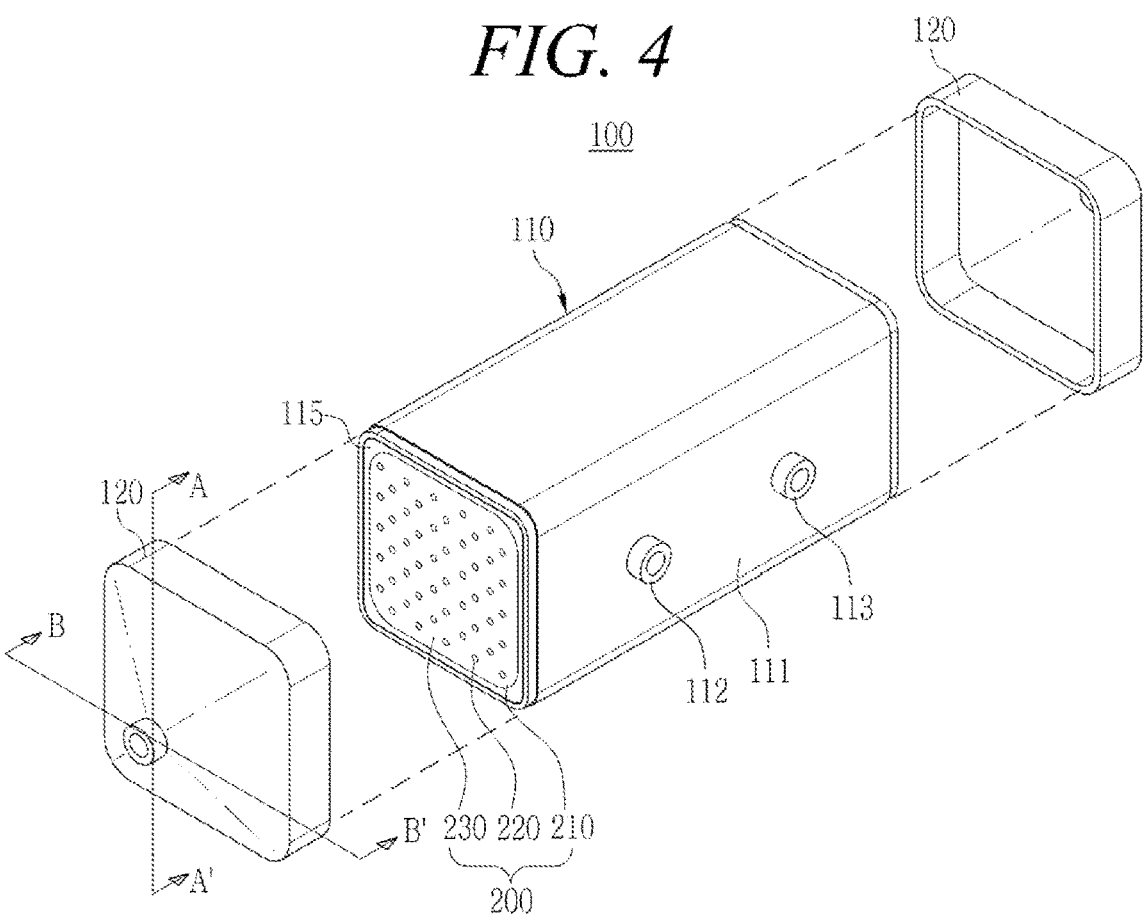
FIG. 4 is an exploded perspective view illustrating a fuel cell membrane humidifier according to an embodiment of the present invention.
Figure 5:
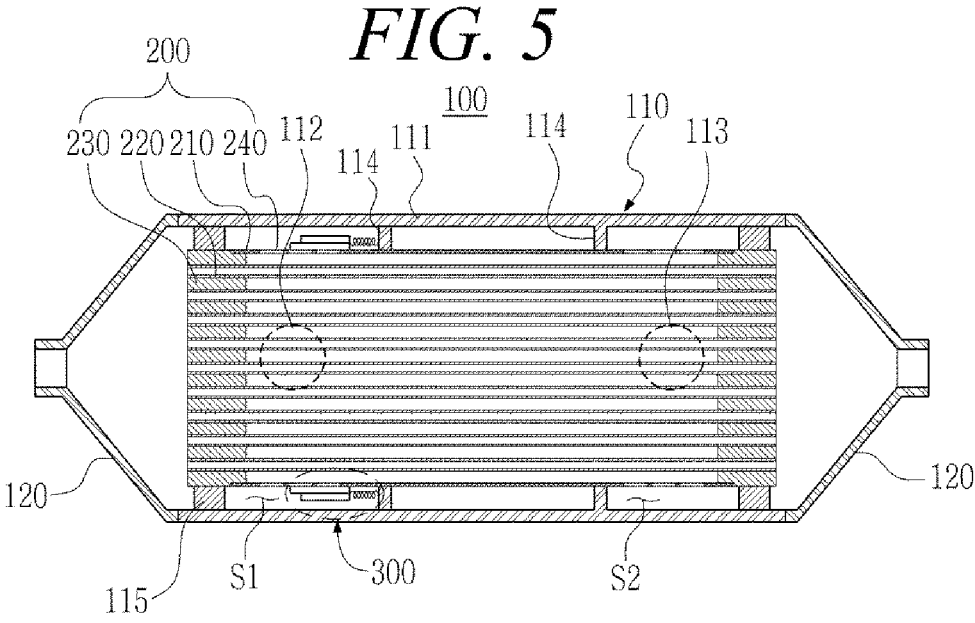
FIG. 5 is a cross-sectional view taken along line A-A' of FIG. 4.
Figure 6:
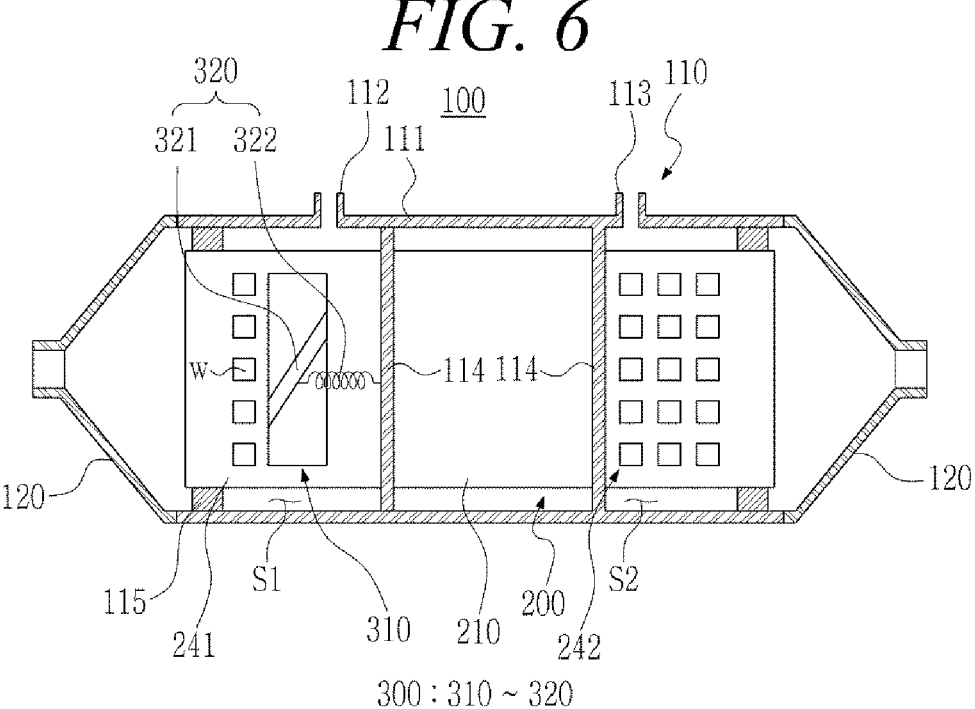
FIGS. 6 and 7 are cross-sectional views viewed along line B-B' of FIG. 4.
Figure 7:
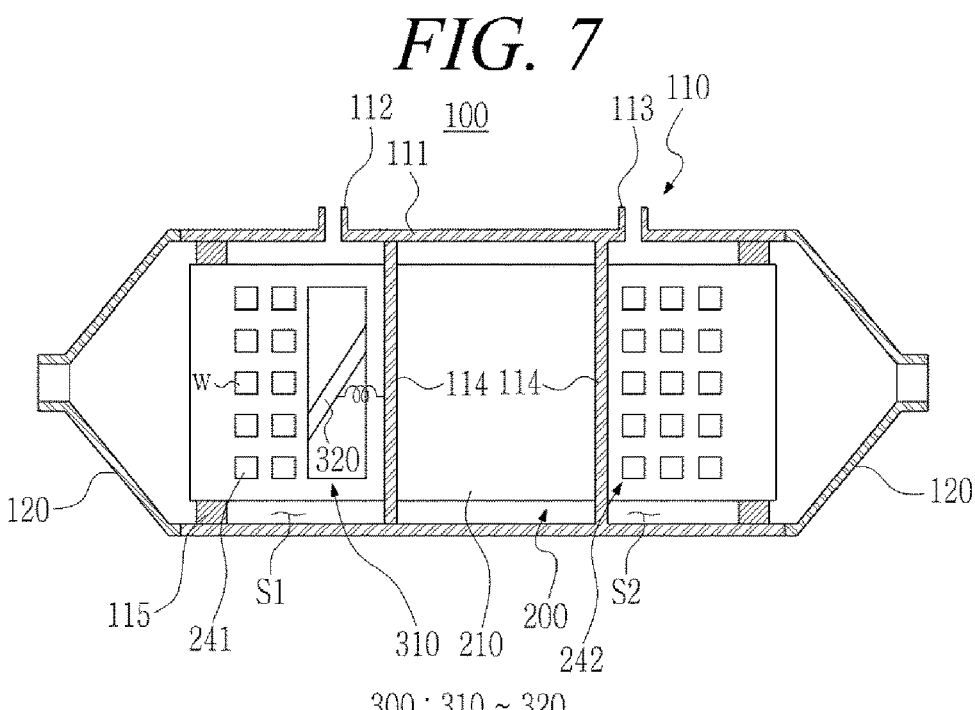

FIG. 4 is an exploded perspective view of a fuel cell membrane humidifier according to an embodiment of the present invention, FIG. 5 is a cross-sectional view taken along line A-A' in FIG. 4, and FIGS. 6 and 7 are cross-sectional views taken along line B-B' in FIG. 4.

Referring to FIGS. 4 to 7, a fuel cell membrane humidifier 100 according to an embodiment of the present invention includes a humidification module 110 and caps 120.

The humidification module 110 performs moisture exchange between air supplied from the outside and an off-gas discharged from a fuel cell stack (not illustrated). The caps 120 are coupled to both ends of the humidification module 110. One of the caps 120 supplies the air supplied from the outside to the humidification module 110, and the other supplies air humidified by the humidification module 110 to the fuel cell stack.

The humidification module 110 includes a mid-case 111 having an off-gas inlet 112 and an off-gas outlet 113, and at least one cartridge 200 disposed in the mid-case 111. In this case, a flow rate control portion 300 capable of automatically controlling a flow rate of the off-gas discharged from the fuel cell stack and flowing into the cartridge is installed in the cartridge 200. The flow rate control portion 300 will be described below.

The mid-case 111 and the cap 120 may be independently formed of hard plastic or metal, and may have a cross section in a width direction having a circular or polygonal shape. The circular shape includes an oval shape, and the polygonal shape includes a polygonal shape with rounded corners. Examples of the hard plastic may include polycarbonate, polyamide (PA), polyphthalamide (PPA), and polypropylene (PP). An inner space of the mid-case 111 may be partitioned into a first space S1 and a second space S2 by partition walls 114.

The cartridge 200 may include a plurality of hollow fiber membranes 220 and potting portions 230 that fix the hollow fiber membranes 112a to each other. Ends of the hollow fiber membranes 220 may be fixed to the potting portions 112b.

Further, the cartridge 200 may further include an inner case 210. The inner case 210 has an opening at each end, and the hollow fiber membranes 220 is accommodated therein. The potting portion 230 in which ends of the hollow fiber membranes 220 are potted closes the opening of the inner case 210.

The inner case 210 includes a first mesh hole portion 241 disposed in a mesh form for fluid communication with the first space S1, and a second mesh hole portion 242 disposed in a mesh form for fluid communication with the second space S2. The first mesh hole portion 241 and the second mesh hole portion 242 constitute a mesh hole portion 240.

The off-gas flowing into the first space S1 of the mid-case 111 through the off-gas inlet 112 flows into the inner case 210 through the first mesh hole portion 241 and comes into contact with outer surfaces of the hollow fiber membranes 220. Subsequently, the off-gas deprived of moisture exits the second space S2 through the second mesh hole portion 242, and then, is discharged from the mid-case 111 through the off-gas outlet 113. In this case, a flow rate of the off-gas flowing into the inner case 210 through the first mesh hole portion 241 may be automatically controlled by the flow rate control portion 300.

The hollow fiber membranes 220 may include a polymer membrane formed of a polysulfone resin, a polyethersulfone resin, a sulfonated polysulfone resin, a polyvinylidene fluoride (PVDF) resin, a polyacrylonitrile (PAN) resin, a polyimide resin, a polyamideimide resin, a polyesterimide resin, or a mixture of two or more of these, and the potting portions 230 may be formed by curing a liquid resin such as a liquid polyurethane resin through a casting scheme such as deep potting or centrifugal potting.

A resin layer 115 is formed between the cartridge 200 and the mid-case 111, and the resin layer 115 fixes the cartridge 200 to the mid-case 111 and blocks inner spaces of the caps 120 and an inner space of the mid-case 111. The resin layer 115 may be replaced with a gasket assembly that is airtightly coupled to each end of the humidification module 110 through mechanical assembly depending on a design.

Referring to FIG. 6, the cartridge 200 according to the embodiment of the present invention includes the flow rate control portion 300 that automatically controls the flow rate of the off-gas flowing into the inner case 210 through the first mesh hole portion 241. The flow rate control portion 300 is formed to be movable on one surface of the inner case 210 depending on the flow rate of the off-gas, to automatically control the flow rate of the off-gas.

Figure 8:
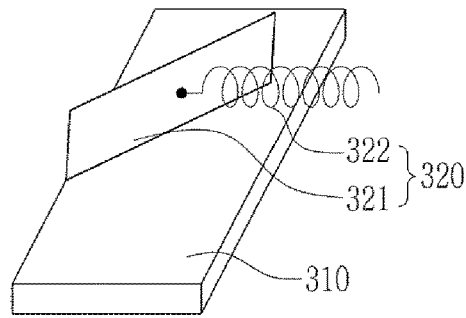
FIG. 8 is a perspective view illustrating a flow rate control portion.

Referring to FIG. 8, the flow rate control portion 300 includes a blocking member 310 and a control member 320. The blocking member 310 is formed on the one surface of the inner case 210 to block at least one mesh hole window W constituting the first mesh hole portion 241 so that the off-gas does not flow into the inside. The blocking member 310 may be formed in a shape corresponding to the one surface of the inner case 210.

The control member 320 is formed to fixed to one surface of the blocking member 310. The control member 320 moves the blocking member 310 while being compressed or expanded depending on the flow rate of the off-gas. Specifically, the control member 320 includes a pressing member 321 and an elastic member 322. The pressing member 321 is formed in a form inclined at a predetermined angle with respect to one side (vertical side or horizontal side) of the blocking member 310 and is formed to extend from an upper surface of the blocking member 310 to a predetermined height. The elastic member 322 is formed of a member capable of being compressed or expanded according to pressure, and one end thereof is fixed to the partition wall 114 and the other end is fixed to the pressing member 321. Alternatively, the one end of the elastic member 322 may be fixed to the resin layer 115 or a gasket assembly (not illustrated), and the other end may be fixed to the pressing member 321.

Figure 9:
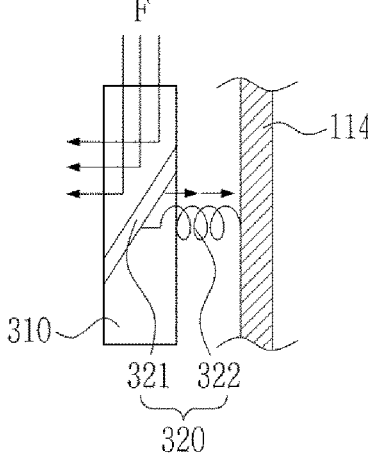
FIG. 9 is a plan view illustrating an operation process of the flow rate control portion.

An operation of the flow rate control portion 300 configured as described above will be described with reference to FIG. 9. FIG. 9 is a plan view illustrating an operation process of the flow rate control portion 300.

After the off-gas discharged from the fuel cell stack flows into the inside through the off-gas inlet 112, the off-gas flows into the inner case 210 in which the hollow fiber membranes are disposed, through the mesh hole windows W constituting the first mesh hole portion 241 while flowing in the first space S1 inside the mid-case 111. In this case, at least a part of the off-gas flow (F) presses the pressing member 321 while colliding with the pressing member 321 formed on the upper surface of the blocking member 310. The elastic member 322 is compressed by the pressing, and accordingly, the pressing member 321 moves toward the partition wall 114. In this case, the blocking member 310 formed to be fixed to the pressing member 321 also moves together. A larger number of mesh hole windows W constituting the first mesh hole portion 241 are opened due to a movement of the blocking member 310 (see FIGS. 6 and 7).

The off-gas flow F strongly presses the pressing member 321 to open a relatively large number of mesh hole windows W when the flow rate of the off-gas discharged from the fuel cell stack is high, and weakly presses the pressing member 321 to open a relatively small number of mesh hole windows W when the flow rate of the off-gas is low. Therefore, the flow rate control portion 300 can automatically control the flow rate of the off-gas flowing into the inner case 210 depending on the flow rate of the off-gas.

Although the embodiment of the present invention has been described above, those skilled in the art can variously modify or change the present invention through affixation, change, deletion, addition, or the like of components without departing from the spirit of the present invention described in the claims, and this will be said to be also included within the scope of the present invention.

DETAILED DESCRIPTION OF MAIN ELEMENTS

100: fuel cell membrane humidifier
110: humidification module 111: mid-case
112: off-gas inlet 113: off-gas outlet
114: partition wall 115: resin layer
200: cartridge 210: inner case
220: hollow fiber membrane 230: potting portion
240: mesh hole portion
300: flow rate control portion 310: blocking member
320: control member 321: pressing member
322: elastic member

The invention claimed is:

1. An automatic flow rate control cartridge comprising:
an inner case including a first mesh hole portion through which an off-gas discharged from a fuel cell stack flows into the inside, and a second mesh hole portion through which the off-gas flowing into the inside through the first mesh hole portion is discharged to the outside after moisture exchange; and
a flow rate control portion formed to be movable on a surface of the inner case and configured to control a flow rate of the off-gas flowing into the inside through the first mesh hole portion depending on the flow rate of the off-gas,
wherein the flow rate control portion includes
a blocking member formed on one surface of the inner case to block at least one mesh hole window constituting the first mesh hole portion so that the off-gas does not flow into the inside; and
a control member formed on one surface of the blocking member and configured to move the blocking member while being compressed or expanded depending on the flow rate of the off-gas.

2. The automatic flow rate control cartridge of claim 1, wherein the control member includes
a pressing member formed in a form inclined at a predetermined angle with respect to one side of the blocking member; and
an elastic member formed to be fixed to the pressing member and capable of being compressed or expanded depending on the flow rate of the off-gas.

3. The automatic flow rate control cartridge of claim 2, wherein the pressing member is formed to extend from an upper surface of the blocking member to a predetermined height.

4. The automatic flow rate control cartridge of claim 2, wherein one end of the elastic me fiber to the partition wall and the other end is fixed to the pressing member.

5. The automatic flow rate control cartridge of claim 2, wherein one end of the elastic member is fixed to a resin layer or a gasket assembly, and the other end is fixed to the pressing member.

6. The automat flow rate control cartridge of claim 1, further comprise a plurality of hollow fiber membranes and a potting portions that fix the hollow fiber membranes to each other.

7. The automatic flow rate control cartridge of claim 6, wherein the inner case has an opening at each end and the potting portion in which ends of the hollow fiber membranes are potted closes the opening of the inner case.

8. The automatic flow rat control cartridge of claim 6, wherein the hollow fiber membranes include a polymer membrane formed of a polysulfone resin, a polyethersulfone resin, a sulfonated polysulfone resin, a polyvinylidene fluoride (PVDF) resin, a polyacrylonitrile (PAN) resin, a polyimide resin, a polyamideimide resin, a polyesterimide resin, or a mixture of two or more of these.

9. The automatic flow rate control cartridge of claim 6, wherein the potting is formed by curing a liquid resin through a casting scheme.

10. A fuel cell membrane humidifier comprising:
a mid-case;
caps fastened to the mid-case; and
at least one cartridge disposed in the mid-case and configured to accommodate a plurality of hollow fiber membranes, wherein the cartridge includes
an inner case including a first mesh hole portion through which an off-gas discharged from a fuel cell stack flows into the inside, and a second mesh hole portion through which the off-gas flowing into the inside through the first mesh hole portion is discharged to the outside after moisture exchange; and
a flow rate control portion formed to be movable on a surface of the inner case and configured to control a flow rate of the off-gas flowing into the inside through the first mesh hole portion depending on the flow rate of the off-gas,
wherein the flow rate control portion includes
a blocking member formed on one surface of the inner case to block at least one mesh hole window constituting the first mesh hole portion so that the off-gas does not flow into the inside; and
a control member formed on one surface of the blocking member and configured to move the blocking member while being compressed or expanded depending on the flow rate of the off-gas.

11. The fuel cell membrane humidifier of claim 10, wherein the control member includes a pressing member formed in a form inclined at a predetermined angle with respect to one side of the blocking member; and an elastic member formed to be fixed to the pressing member and capable of being compressed or expanded depending on the flow rate of the off-gas.

12. The fuel cell membrane humidifier of claim 11, wherein the pressing member is formed to extend from an upper surface of the blocking member to a predetermined height.

13. The fuel cell membrane humidifier of claim 11, wherein one end of the elastic member is fixed to the partition wall and the other end is fixed to the pressing member.

14. The fuel cell membrane humidifier of claim 11, wherein one end of the elastic member is fixed to a resin layer or a casket assembly, and the other end is fixed to the pressing member.

15. The fuel cell membrane humidifier of claim 10, further comprise a plurality of hollow fiber membranes and a potting portions that fix the hollow fiber membranes to each other.

16. The fuel cell membrane humidifier of claim 15, wherein the inner case has an opening at each end, and the potting portion in which ends of the hollow fiber membranes are potted closes the opening of the inner case.

17. The fuel cell membrane humidifier of claim 15, wherein the hollow fiber membranes include a polymer membrane formed of a polysulfone resin, a polyethersulfone resin, a sulfonated polysulfone resin, a polyvinylidene fluoride (PVDF) resin, a polyacrylonitrile (PAN) resin, a polyimide resin, a polyamideimide resin, a polyesterimide resin, or a mixture of two or more of these.

18. The fuel cell membrane humidifier of claim 15, wherein the potting portions is formed by curing a liquid resin through a casting scheme.

\* \* \* \* \*